United States Patent
Klemenz et al.

(10) Patent No.: US 8,548,183 B2
(45) Date of Patent: Oct. 1, 2013

(54) HEARING DEVICE WITH INDIVIDUALLY ALIGNED ELECTRONIC COMPONENT AND PRODUCTION METHOD

(75) Inventors: Harald Klemenz, Fürth (DE); Poh Chye Lim, Singapore (SG); Markus Wild, Unterdietfurt (DE); Kim Ho Patrick Yau, Singapore (SG)

(73) Assignee: Siemens Medical Instruments Pte. Ltd., Singapore (SG)

( * ) Notice: Subject to any disclaimer, the term of this patent is extended or adjusted under 35 U.S.C. 154(b) by 502 days.

(21) Appl. No.: 12/706,891

(22) Filed: Feb. 17, 2010

(65) Prior Publication Data

US 2010/0208926 A1    Aug. 19, 2010

(30) Foreign Application Priority Data

Feb. 17, 2009   (DE) .................... 10 2009 009 286

(51) Int. Cl.
    *H04R 25/00*   (2006.01)
(52) U.S. Cl.
    USPC ........................... 381/324; 381/322; 381/330
(58) Field of Classification Search
    USPC .................... 381/323, 324, 328, 312, 322
    See application file for complete search history.

(56) References Cited

U.S. PATENT DOCUMENTS

| | | | |
|---|---|---|---|
| 4,860,362 A * | 8/1989 | Tweedle | 381/322 |
| 5,915,031 A | 6/1999 | Hanright | |
| 7,127,077 B2 * | 10/2006 | Hall et al. | 381/312 |
| 7,844,066 B2 | 11/2010 | Sauer et al. | |
| 2002/0196954 A1 * | 12/2002 | Marxen et al. | 381/312 |
| 2003/0089548 A1 | 5/2003 | Frederiksen et al. | |
| 2003/0152242 A1 | 8/2003 | Marxen et al. | |
| 2004/0105561 A1 | 6/2004 | Olsen | |
| 2004/0120538 A1 | 6/2004 | Hall et al. | |
| 2007/0047750 A1 | 3/2007 | Sauer et al. | |
| 2007/0230730 A1 | 10/2007 | Klemenz et al. | |

FOREIGN PATENT DOCUMENTS

| | | | |
|---|---|---|---|
| DE | 102005040542 B3 | 4/2007 | |
| DE | 102006014884 B3 | 8/2007 | |
| WO | 9812897 A1 | 3/1998 | |

OTHER PUBLICATIONS

European Search Report dated Apr. 19, 2010.

\* cited by examiner

*Primary Examiner* — Davetta W Goins
*Assistant Examiner* — Amir Etesam
(74) *Attorney, Agent, or Firm* — Laurence A. Greenberg; Werner H. Stemer; Ralph E. Locher

(57) ABSTRACT

The equipment size of a hearing device is intended to be reduced. Therefore, a hearing device, in particular an ITE hearing aid, is proposed with a shell having a user-specific shape, a faceplate for closing-off the shell and an electronic component which is attached to the faceplate using a support. The support is individually formed taking into account the shape of the shell, and/or a position of the support on the faceplate is individually determined taking into account the shape of the shell. As a result of the individual support, it is possible to cut down on installation space and therefore the shell can be shortened. In particular, the support can be formed integrally with the faceplate in order to simplify the production method.

14 Claims, 3 Drawing Sheets

HEARING DEVICE WITH INDIVIDUALLY ALIGNED ELECTRONIC COMPONENT AND PRODUCTION METHOD

CROSS-REFERENCE TO RELATED APPLICATION

This application claims the priority, under 35 U.S.C. §119, of German application DE 10 2009 009 286.2, filed Feb. 17, 2009; the prior application is herewith incorporated by reference in its entirety.

BACKGROUND OF THE INVENTION

Field of the Invention

The present invention relates to a hearing device to be worn in the auditory canal with a shell having a user-specific shape, a faceplate for closing-off the shell and an electronic component which is attached to the faceplate using a support. Moreover, the invention relates to a method for producing a faceplate module for a hearing device to be worn in the auditory canal by providing a shell or geometric data of a shell which has a user-specific shape, producing a faceplate for closing-off the shell and attaching an electronic component to the faceplate using a support.

The term "hearing device" in this case is understood to mean any portable sound-emitting equipment in/on the ear or on the head, in particular a hearing aid, a headset, earphones or the like.

Hearing aids are portable hearing devices used to support the hard of hearing. In order to make concessions for the numerous individual requirements, different types of hearing aids are provided, e.g. behind-the-ear (BTE) hearing aids, hearing aids with an external earpiece (receiver in the canal [RIC]) and in-the-ear (ITE) hearing aids, for example concha hearing aids or canal hearing aids (ITE, CIC) as well. The hearing aids listed in an exemplary fashion are worn on the concha or in the auditory canal. Furthermore, bone conduction hearing aids, implantable or vibrotactile hearing aids are also commercially available. In this case the damaged sense of hearing is stimulated either mechanically or electrically.

In principle, the main components of hearing aids are an input transducer, an amplifier and an output transducer. In general, the input transducer is a sound receiver, e.g. a microphone, and/or an electromagnetic receiver, e.g. an induction coil. The output transducer is usually configured as an electroacoustic transducer, e.g. a miniaturized loudspeaker, or as an electromechanical transducer, e.g. a bone conduction earpiece. The amplifier is usually integrated into a signal processing unit. This basic configuration is illustrated in FIG. 1 using the example of a behind-the-ear hearing aid. One or more microphones 2 for recording the sound from the surroundings are installed in a hearing aid housing 1 to be worn behind the ear. A signal processing unit 3, likewise integrated into the hearing aid housing 1, processes the microphone signals and amplifies them. The output signal of the signal processing unit 3 is transferred to a loudspeaker or earpiece 4 which emits an acoustic signal. If necessary, the sound is transferred to the eardrum of the equipment wearer using a sound tube which is fixed in the auditory canal with an ear mold. A battery 5 likewise integrated into the hearing aid housing 1 supplies the hearing aid and in particular the signal processing unit 3 with energy.

Hearing aids and, in particular, ITE equipment as well should have a configuration which is as small as possible. For this, electronic components which are as small as possible should be used and should be arranged within the hearing aid shell such that as little installation space as possible is lost. It is often necessary, particularly when producing very small equipment, to place the circuit (e.g. hybrid circuit; printed circuit board with circuit elements) at an angle in respect of the faceplate.

By way of example, a number of standard faceplates with differing sizes are available within current production processes due to the different geometries of the ITE shells. Using an electronic modeling method, the faceplates are first of all fitted into the ITE housing in a virtual fashion such that the length of the ITE equipment is as short as possible. In order to achieve a minimum length, the circuit or the hybrid has to respectively be placed individually (horizontally, vertically, obliquely) on the faceplate as a result of the different geometries of the ITE housings. For this purpose, the circuit or hybrid is adhesively bonded to a support, e.g. a ramp. Thus, for example, three different models are currently used for the electronic modeling and they differ in respect of the support for the circuit (support for horizontally, vertically and obliquely placed circuits). The user must select one of the models in the electronic modeling method, by which model the minimum ITE equipment length is ultimately obtained.

SUMMARY OF THE INVENTION

It is accordingly an object of the invention to provide a hearing device with an individually aligned electronic component and a production method which overcome the above-mentioned disadvantages of the prior art methods and devices of this general type, which compared to known hearing devices is more compact.

According to the invention, the object is achieved by a hearing device to be worn in the auditory canal with a shell having a user-specific shape, a faceplate for closing-off the shell and an electronic component which is attached to the faceplate using a support. Wherein the support is individually formed taking into account the shape of the shell, and/or the position of the support on the faceplate is individually determined taking into account the shape of the shell.

Moreover, according to the invention, provision is made for a method for producing a faceplate module for a hearing device to be worn in the auditory canal by providing a shell or geometric data of a shell which has a user-specific shape, producing a faceplate for closing-off the shell and attaching an electronic component to the faceplate using a support, and individually forming the support taking into account the shape of the shell or the geometric data thereof, and/or individually determining, by computational measures and by taking into account the shape of the shell or the geometric data thereof, a position of the support on the faceplate where the support with the electronic component is intended to be attached.

Advantageously, the individual configuration of the support affords the possibility of arranging the electronic component in the shell with fewer gaps and so the installation space can overall be used more effectively. In particular, the shape and/or the position of the support can be determined by computational measures and so the entire production process of the hearing device can be further optimized and can be configured in a more cost-effective fashion.

The electronic component is preferably a hybrid circuit. Such hybrid circuits generally constitute relatively large components within the hearing device or the hearing aid and so it is particularly worthwhile for the circuits to be placed in an optimum fashion.

In accordance with a particularly preferred embodiment, the faceplate is formed integrally with the support. This can save or reduce the complexity of complicated production steps relating to the individual placement of a support and the logistics of the individual parts. In this case, the integral production of the faceplate together with the support is carried out by combining the method steps of producing a standard faceplate and shaping or positioning the support in an injection molding method or else in a lithography method or sintering method. In particular, a standard faceplate is then individualized by molding the support thereon.

Furthermore, the faceplate can have a positioning element next to which or by which the support is attached to the faceplate. In particular, it is advantageous if the positioning element in this case is configured as a guide groove, as a hole or as a guide rail. As a result of this, the support can be attached to the faceplate with relatively little effort. The support itself can be produced from an elastic band. Thus, it can be adhesively bonded to the faceplate and can easily be processed thereafter by cutting into shape.

Within the scope of the overall production process, it is usually expedient to determine a plurality of possible positions for the support. An assembler can then select that position which leads to the smallest or shortest equipment.

After determining the position or shape of the individual support by computational measures, it can furthermore be possible for a parameter of the support to be changed, e.g. the position thereof, the geometry thereof or the size thereof. This can also lead to further optimization of the equipment size.

As indicated previously, the faceplate can be produced by, for example, stereolithography or laser sintering. These rapid prototyping methods afford the possibility of a fast and cost-effective individual production.

Other features which are considered as characteristic for the invention are set forth in the appended claims.

Although the invention is illustrated and described herein as embodied in a hearing device with an individually aligned electronic component and a production method, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

The exemplary embodiments explained in more detail below illustrate preferred embodiments of the present invention.

Figure 1:
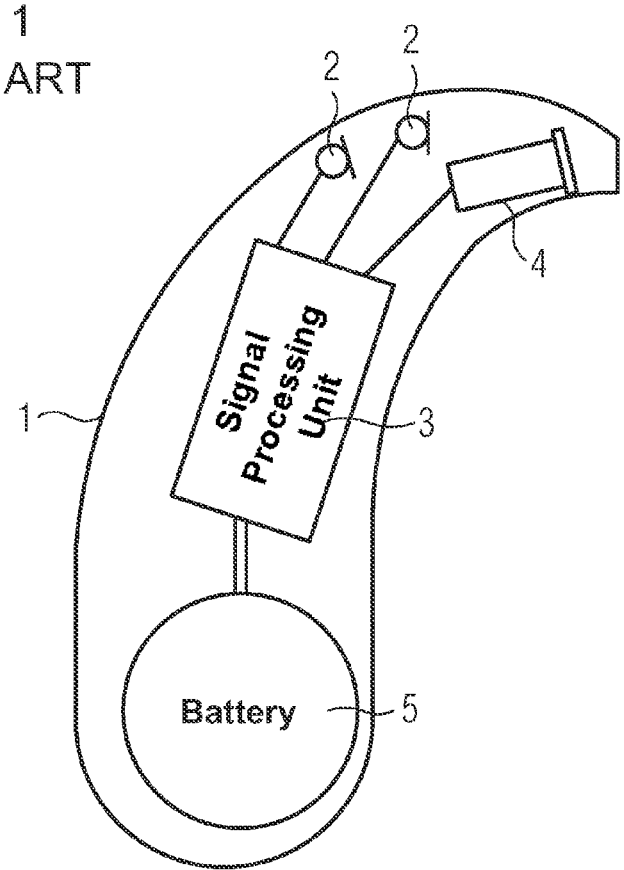
FIG. 1 is an illustration of a basic configuration of a hearing aid according to the prior art.
Figure 2:
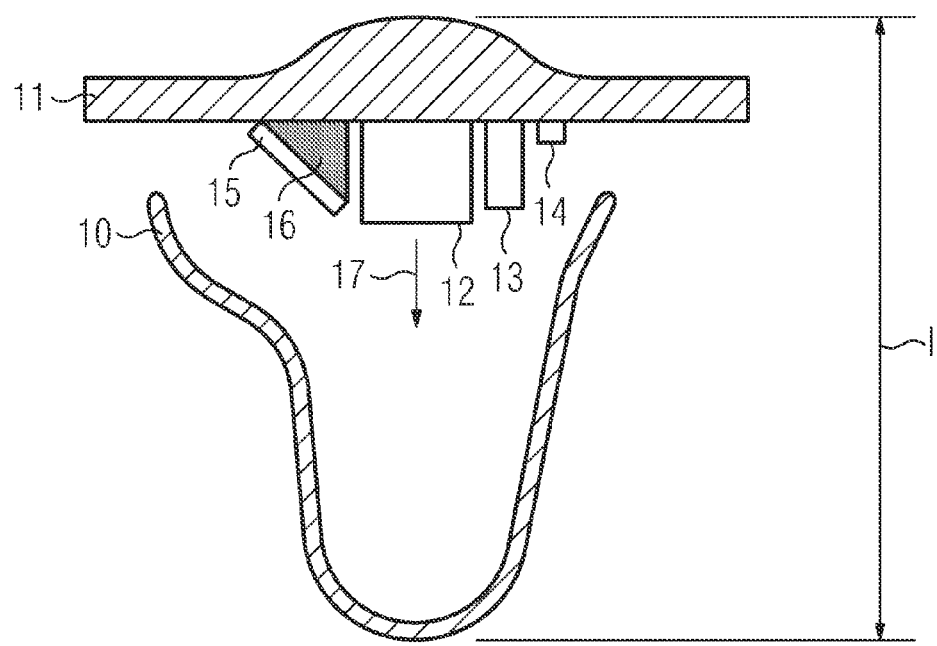
FIG. 2 is a diagrammatic, longitudinal sectional view through a hearing device according to the invention.

Referring now to the figures of the drawing in detail and first, particularly, to FIG. 2 thereof, there is shown a longitudinal section of an individually produced ITE shell 10. The ITE shell 10 is closed off by a faceplate module (faceplate 11 with electronic components). The faceplate 11 is generally a standard component only individualized when being attached to the shell 10. FIG. 2 illustrates this in that the edge of the faceplate 11 projects beyond the edge of the shell 10.

In addition to other electronic components 12, 13 and 14, a hybrid circuit 15 is also attached to the faceplate on the side facing the shell 10. In this case, the hybrid circuit is adhesively bonded to the faceplate 11 with the aid of a wedge-shaped support 16. The wedge-shaped support 16 allows the space in the shell 10 to be utilized more effectively and so a length I of the overall ITE hearing aid can be shortened because the shell 10 in particular can have a shorter configuration.

In the example shown in FIG. 2, the faceplate 11 including components 12 to 16 is placed onto the shell 10 as per arrow 17. Since the hybrid circuit 15 and the section of the shell 10 opposing it are arranged at a similar angle, the installation space in the hearing aid can be utilized more effectively. In other words, the angle of the hybrid circuit 15 or support 16 was matched to the individual shape of the shell 10.

Modeling software affords the possibility of, for example, individually equipping the faceplates with supports 16 for the circuits 15. In this case, a support is intended to be added to a neutral standard faceplate (without support for a hybrid or a circuit). The support should be configured or placed such that an ITE equipment length is achieved which is as short as possible. For this purpose, the modeling software calculates the position, geometry and size (length, breadth, angle) parameters of the support. The corresponding parameter values are output by a table. In the process, it is expedient for the modeling software to communicate to the user a number of possibilities for placing the hybrid. Furthermore, provision can be made for the user to modify these parameters independently in order to undertake further optimizations.

The configured faceplate can then be produced integrally together with the support using a rapid prototyping method, such as selective laser sintering (SLS), stereolithography (STL), rapid shell manufacturing (RSM), and laser cutting from a solid body or using an injection molding method. It goes without saying that it is also possible for the support for the hybrid or the circuit to be produced separately. This can occur together with the ITE equipment shells in one of the rapid prototyping methods, but also in the other abovementioned production methods. The separately produced support is then attached to the neutral standard faceplate, which was likewise produced by one of the abovementioned production methods, using for example an adhesive bond.

The use of the specified modeling software (including the forming and/or placing of a support) on the one hand allows the ITE equipment length to be shortened, as explained. On the other hand, if the support is formed integrally with the faceplate, storing a number of standard faceplates is no longer required since the latter are produced individually. If the support is produced separately, it is only necessary for the neutral standard faceplates to be stored.

Figure 3:
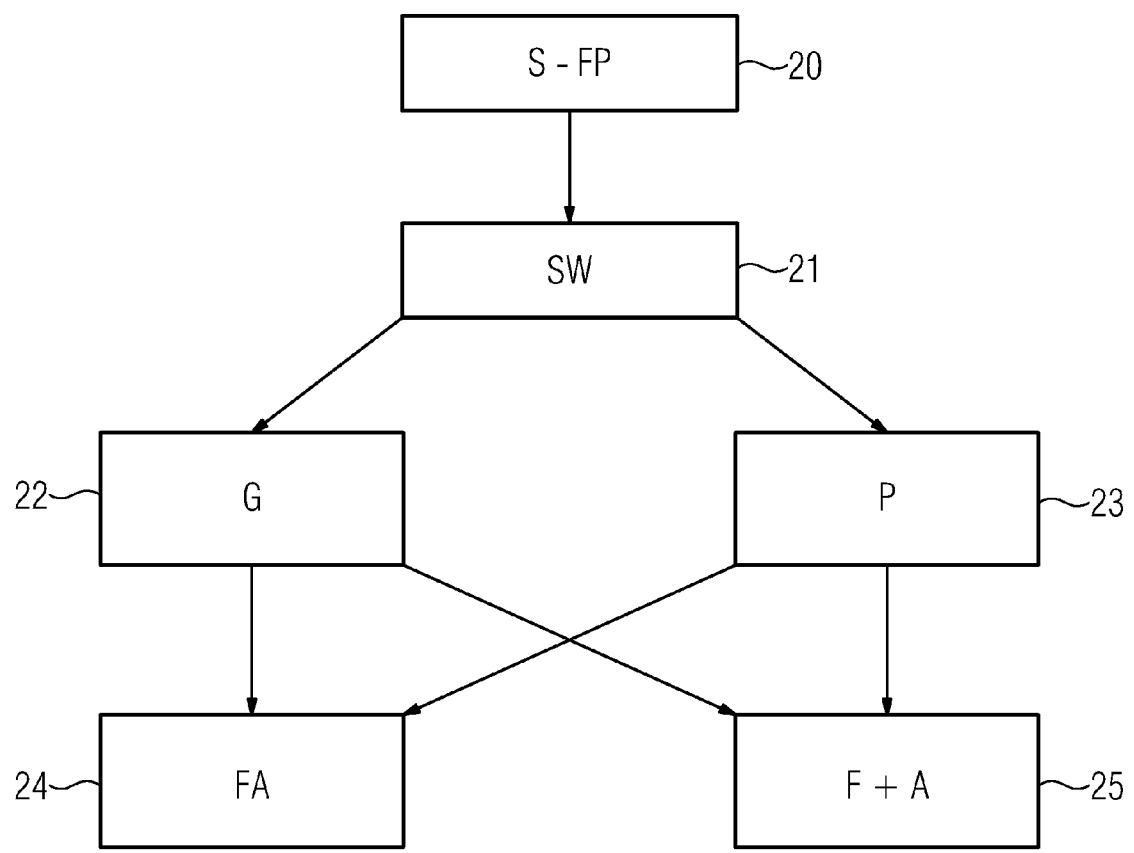
FIG. 3 is a flowchart for the inventive production of a faceplate.

There are different approaches for improving the production method of a faceplate with an individual support. FIG. 3 schematically shows the basic steps of these production methods. First of all, a virtual standard faceplate S-FP is provided in a first step 20. Using the modeling software (SW) 21, geometric parameters G of an individual support 16 are determined for the standard faceplate S-FP in step 22. If need be, a plurality of appropriate parameters are provided, similarly to a sorting box. Moreover, the software 21 provides placement values for the support 16 in step 23. The placement values P can relate to a plurality of possible placements which the user can select.

Finally, an individual faceplate including the support 16 can be produced in work step 24 as a single component (FA) on the basis of the standard faceplate S-FP and the data G and P. By way of example, this individualized faceplate is produced by the STL method with the desired support. Alternatively, the faceplate including the desired support can also be cut from a solid body using a laser.

Figure 4A:
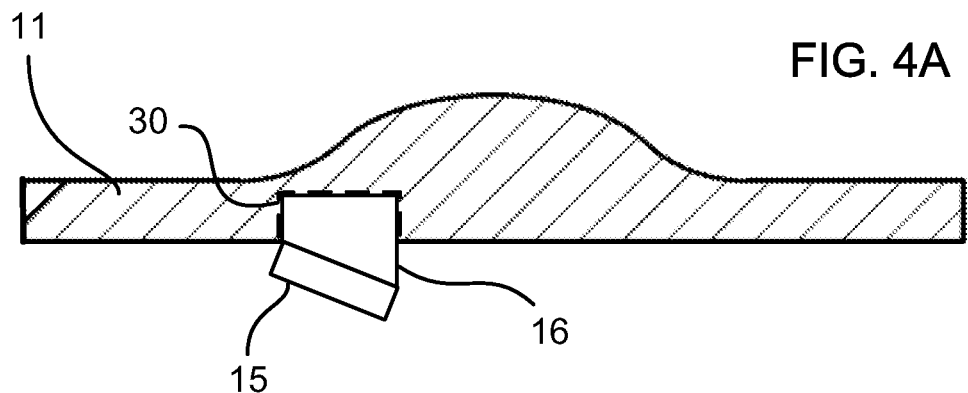
FIG. 4A is a diagrammatic, longitudinal sectional view through a second embodiment of a face plate.
Figure 4B:
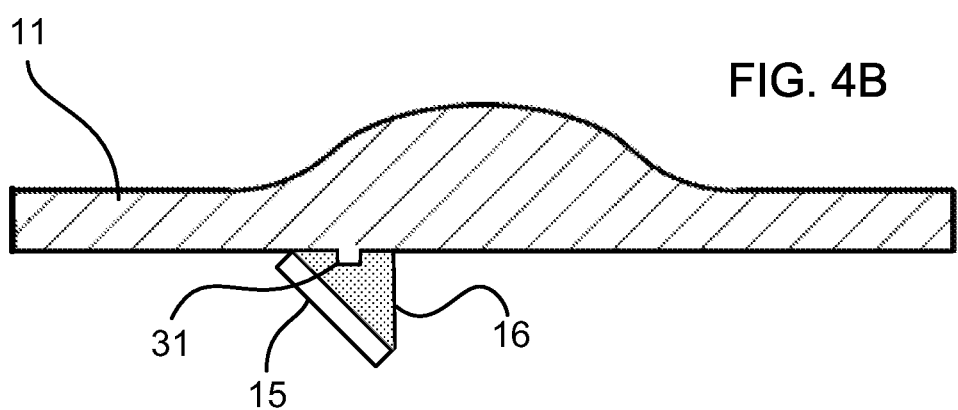
FIG. 4B is a diagrammatic, longitudinal sectional view through a third embodiment of the face plate.
Figure 4C:
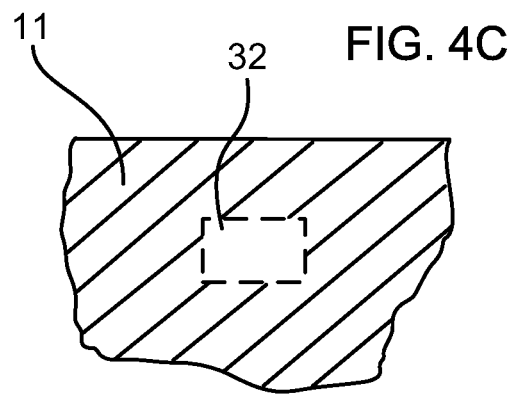
FIG. 4C is a diagrammatic, view of a fourth embodiment of the face plate.

As an alternative to work step 24, the support and the faceplate can be produced separately (F+A) in a work step 25 and the support can subsequently be applied to the standard faceplate. Here, it is advantageous if the faceplates 11 with a marker or a positioning element (guide groove 30 or hole 32) are produced as standard or neutral parts, see FIGS. 4A-4C. As mentioned, injection molding or rapid prototyping methods such as STS, STL or RSM are suitable for the production. Furthermore, the supports 16 (e.g. ramps or wedges) are likewise produced as independent components with different embodiments using the abovementioned methods. The various supports differ in size and angle. So that the supports can be placed onto the faceplate in a simple and precise fashion, they are provided with the counterpart (e.g. pin) of the marker or positioning element. Finally, a support is selected for the respective case and adhesively bonded to the faceplate. In an alternative embodiment, neutral or standard faceplates 11 provided with guide rails 31 can likewise be produced. These guide rails 31 at the same time ensure the mechanical hold of the supports 16.

According to a further embodiment, an elastic band is adhesively bonded to the neutrally produced faceplates and the band constitutes the support for the hybrid or the circuit. The elastic band can be individually cut from a roll in different embodiments (angle and size) and with the desired length.

The advantages of the solutions illustrated above lie in the fact that, as likewise mentioned above, on the one hand the ITE equipment length can be further reduced by the individual selection of the supports. However, on the other hand, the stock of faceplates is minimized to one standard or neutral part per size.

The invention claimed is:

1. A hearing device to be worn in an auditory canal, the hearing device comprising:
    a shell having a user-specific shape;
    a faceplate closing-off said shell, said faceplate being a pre-given standard faceplate;
    an electronic component being a hybrid circuit; and
    a wedge-shaped support, said electronic component attached to said faceplate using said wedge-shaped support, said wedge-shaped support being individually formed taking into account said user-specific shape of said shell and a position of said wedge-shaped support on said faceplate is individually determined for a user taking into account said user-specific shape of said shell.

2. The hearing device according to claim 1, wherein said faceplate is formed integrally with said wedge-shaped support.

3. The hearing device according to claim 1, wherein said faceplate has a positioning element next to which or by means of which said wedge-shaped support is attached to said faceplate.

4. The hearing device according to claim 3, wherein said positioning element is a one of a guide groove, a hole and a guide rail.

5. The hearing device according to claim 1, wherein said wedge-shaped support is produced from an elastic band.

6. A hearing device to be worn in an auditory canal, the hearing device comprising:
    a shell having a user-specific shape;
    a faceplate closing-off said shell, said faceplate being a pre-given standard faceplate;
    an electronic component being a hybrid circuit; and
    a wedge-shaped support, said electronic component attached to said faceplate using said wedge-shaped support, said wedge-shaped support being individually formed for a user taking into account said user-specific shape of said shell.

7. A hearing device to be worn in an auditory canal, the hearing device comprising:
    a shell having a user-specific shape;
    a faceplate closing-off said shell, said faceplate being a pre-given standard faceplate;
    an electronic component being a hybrid circuit; and
    a wedge-shaped support, said electronic component attached to said faceplate using said wedge-shaped support, said wedge-shaped support on said faceplate is individually determined for a user taking into account said user-specific shape of said shell.

8. A method for producing a faceplate module for a hearing device to be worn in an auditory canal, which comprises the steps of:
    providing one of a shell and geometric data of the shell having a user-specific shape;
    producing a faceplate as a standard faceplate for closing-off the shell;
    individually forming a wedge-shaped support for a user taking into account the user-specific shape of the shell or the geometric data thereof;
    individually determining for the user, by computational means and by taking into account the user-specific shape of the shell or the geometric data thereof, a position of the wedge-shaped support on the faceplate where the wedge-shaped support with the electronic component is intended to be attached; and
    attaching a hybrid circuit to the faceplate using the wedge-shaped support, the faceplate being individualized by attaching the wedge-shaped support.

9. The method according to claim 8, which further comprises determining a plurality of possible positions for the wedge-shaped support.

10. The method according to claim 8, which further comprises individually correcting the position after it has been determined by computational means.

11. The method according to claim 8, which further comprises producing the faceplate integrally with the wedge-shaped support.

12. The method according to claims 8, which further comprises producing the faceplate by one of stereolithography and laser sintering.

13. A method for producing a faceplate module for a hearing device to be worn in an auditory canal, which comprises the steps of:
    providing one of a shell and geometric data of the shell having a user-specific shape;
    producing a faceplate as a standard faceplate for closing-off the shell;
    individually forming a wedge-shaped support for a user taking into account the user-specific shape of the shell or the geometric data thereof; and attaching a hybrid circuit to the faceplate using the wedge-shaped support, the faceplate being individualized by attaching the wedge-shaped support.

14. A method for producing a faceplate module for a hearing device to be worn in an auditory canal, which comprises the steps of:

provide one of a shell and geometric data of the shell having a user-specific shape;

producing a faceplate being a standard faceplate for closing-off the shell;

individually determining for a user, by computational means and by taking into account the user-specific shape of the shell or the geometric data thereof, a position of a wedge-shaped support on the faceplate where the wedge-shaped support with a hybrid circuit is intended to be attached; and attaching an electronic component to the faceplate using the wedge-shaped support, the faceplate being individualized by attaching the wedge-shaped support.

* * * * *